United States Patent
Peng

(10) Patent No.: US 7,215,724 B2
(45) Date of Patent: May 8, 2007

(54) SIGNAL DEMODULATION IN A MOBILE RECEIVER

(75) Inventor: Bao-Chi Peng, Hsin-Chu (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 728 days.

(21) Appl. No.: 10/605,998

(22) Filed: Nov. 12, 2003

(65) Prior Publication Data
US 2005/0101278 A1    May 12, 2005

(51) Int. Cl.
H04L 27/06 (2006.01)
H04B 1/06 (2006.01)
H04B 1/10 (2006.01)

(52) U.S. Cl. .................. 375/340; 340/350; 455/238.1

(58) Field of Classification Search ............... 375/147, 375/148, 340, 341, 344, 346, 350; 455/63.1, 455/238.1
See application file for complete search history.

(56) References Cited

U.S. PATENT DOCUMENTS

| | | | |
|---|---|---|---|
| 4,887,050 A | 12/1989 | Borth | |
| 5,594,757 A | 1/1997 | Rohani | |
| 6,044,119 A | 3/2000 | Sato | |
| 6,507,602 B1 * | 1/2003 | Dent | 375/142 |
| 6,658,045 B1 * | 12/2003 | Jin | 375/147 |
| 7,082,155 B1 * | 7/2006 | Ogami | 375/147 |
| 7,088,955 B2 * | 8/2006 | Challa et al. | 455/63.3 |
| 2002/0045433 A1 * | 4/2002 | Vihriala | 455/313 |

* cited by examiner

*Primary Examiner*—Don N. Vo
(74) *Attorney, Agent, or Firm*—Winston Hsu

(57) ABSTRACT

A WCDMA receiver in which the dependencies of different functional modules are arranged to allow proper tailoring of the Channel Estimation (CE) module bandwidth. A PreCE provides rough estimation results of the channel complex gain. The rough estimation results are passed to the Automatic Frequency Control (AFC). The AFC outputs a signal transmitted to two mixers. The first mixer mixes the output of the PreCe with the output of the AFC and outputs the result to a Velocity estimator (VE) and a PostCE to generate the compensating signals. The output of the VE is also transmitted to the PostCE. The output of the PostCE is sent to a Maximum Ratio Combining module, whose output is mixed by the second mixer with the output of the AFC to generate a final signal.

9 Claims, 6 Drawing Sheets

SIGNAL DEMODULATION IN A MOBILE RECEIVER

BACKGROUND OF INVENTION

1. Field of the Invention

This invention relates to signal demodulation during communications between a base station and a mobile module in a 3rd Generation Partnership Project wireless communications network. More specifically, architecture to properly integrate demodulation modules in a 3GPP receiver is disclosed.

2. Description of the Prior Art

A mobile unit in a wireless communications network functions in a difficult environment. Structures and terrain scatter reflect a signal transmitted from a base station to the mobile unit. As a result, the signal picked up by a receiving antenna is a sum of all the scattered and reflected, or multipath, signals. In general, the quality of this received multipath signal is affected by two major factors.

The first factor is called slow fading or lognormal fading. Slow fading results from absorption of the signal by terrain between the base station and the mobile unit. A good example of slow fading is a mobile unit moving through a tunnel, possibly resulting in loss of signal strength.

The second factor is called fast fading, multipath fading, or Rayleigh fading. Rayleigh fading results when the multipath signals arrive at the mobile unit and combine destructively, possibly causing a loss of the entire bandwidth. Another form of Rayleigh fading is a Doppler shift in frequency due to motion of the mobile unit relative to the base station.

For these reasons a typical Wideband Code Division Multiple Access (WCDMA) Universal Mobile Telecommunications System Terrestrial Radio Access Network (UTRAN) receiver requires several modules to demodulate a received signal correctly. A prior art WCDMA UTRAN receiver 110 is shown in FIG. 1. The receiver 110 comprises a Delay Estimation (DE) module 112, Rake Fingers module 115, a Maximum Ratio Combing (MRC) module 118, a Channel Estimation (CE) module 120, a Velocity Estimation (VE) module 122, and an Automatic Frequency Control 125 (AFC) module.

An channel complex gain signal from a Square-Rooted-Raised-Cosine (SRRC) filter (not shown) is transmitted to the DE 112, to the Rake Fingers 115, and to the CE 120. The output of the DE 112 is fed to another input of the Rake Fingers 115. The output of the Rake Fingers 115 then is transmitted to the MRC 118. The output of the CE is transmitted to the VE 122 and to the AFC 125. The output of the AFC 125 is transmitted back to the CE 120 and to another input of the VE 122. The output of the VE 122 is also routed back to the CE 120. Another output of the CE 120 is routed (along with the output of the Rake Fingers 115) to another input of the MRC 118 to complete the generation of the demodulated signal before Demultiplexing and Dechannel Coding (DeMCC).

The CE 120 utilizes a bandwidth filter to help estimate the channel complex gains including amplitude and phases. Bandwidth filters are well known in the art to allow predefined ranges of frequencies to pass while attenuating frequencies outside of the predefined range. Obviously the predefined range is centered on the expected transmission channel. The AFC 125 compensates for the difference in frequencies between the transmitter and the receiver due to variations in local oscillators. The VE 122 measures the velocity of a mobile unit relative to the base station. The AFC 125 and the VE 122 require the estimation results of the CE 120, but the CE 120 also needs the results of the AFC 125 and the VE 122 to work effectively. These feedback loops between the CE 120, the VE 122, and the AFC 125 prevent efficient and stable operation of the receiver 110.

For example, the bandwidth filter of Channel Estimation (CE) in the receiver 110 must be designed for the Doppler spread. This is easily illustrated. FIG. 2 shows a spectrum of channel complex gain 15 of a received signal neatly centered within a relatively large allotted bandwidth filter 10 when no frequency offset exists. FIG. 3 shows a received signals spectrum of channel complex gain 25 remaining within the large allotted bandwidth filter 10 even with a frequency offset. In sharp contrast to these views are FIG. 4 and FIG. 5 showing the same spectrum of channel complex gains 15 (FIG. 4) and 25 (FIG. 5) when a much smaller narrower bandwidth filter 20 is used. FIG. 5 shows the received signals spectrum of channel complex gain 25 falling outside of the allotted bandwidth filter 20 due to a frequency offset, distorting signals.

Note that in a WCDMA system the frequency is required to be within 0.1 ppm, which is around 200 Hz and roughly corresponds to the Doppler induced frequency spread occurring in a mobile unit traveling at 100 kph. There may be an additional frequency offset resulting from variations in local oscillators. Because the VE 122 relies on the results of the CE 120, the bandwidth filter of the CE 120 must be wide enough to allow the complex gain to pass through the CE 120 without encountering the signal distortions shown in FIG. 5, regardless of the speed of the mobile unit. However, to get better performance, the bandwidth filter of the CE 120 should be tailored to fit the Doppler spread.

SUMMARY OF INVENTION

It is therefore a primary objective of the claimed invention to disclose a new architecture for a WCDMA receiver that eliminates feedback loops existing between the functional blocks of the claimed receiver, allowing precise tailoring of Channel Estimation (CE) modules bandwidth and improved performance in a 3GPP wireless communications system.

The claimed WCDMA receiver includes a Delay Estimation (DE) module, a Rake Fingers module, a Maximum Ratio Combining (MRC) module, a Velocity Estimation (VE) module, an Automatic Frequency Control (AFC) module, a first mixer, and a second mixer. Also included in the claimed receiver is a CE that is divided into two parts, a PreCE module and a PostCE module. The PreCE is independent of a Velocity Estimation (VE) module and the Automatic Frequency Control (AFC) while the PostCE depends upon the output of the VE and the AFC.

The PreCE module uses a bandwidth filter that is wide enough to allow the complex gain to pass through the PreCE without encountering signal distortions and passes to the AFC and the first mixer rough estimation results of the channel complex gain. The AFC outputs a signal that is transmitted to the first and second mixer. The first mixer mixes the rough estimation results with the output of the AFC and outputs the result to the VE and to the PostCE module to generate the compensating signals. The output of the VE is also transmitted to the PostCE module and is utilized by the PostCE to adjust for a Doppler induced frequency spread before processing the results of the first mixer. This adjustment allows a bandwidth filter in the PostCE module to be narrower than the bandwidth filter in the PreCE module, improving performance. The output of the PostCE is sent to the MRC. Finally, the second mixer mixes the signal from the AFC with the signal from the MRC to generate a demodulated signal.

It is an advantage of the claimed invention that no feedback loops exists between the functional blocks of the claimed WCDMA receiver, allowing a precisely tailored PostCE bandwidth filter and improved performance in a 3GPP wireless communications system.

DETAILED DESCRIPTION

The present invention discloses an architecture for a WCDMA receiver in which the dependencies of different functional modules are arranged to allow proper tailoring of the Channel Estimation (CE) modules bandwidth. According to the present invention, the CE is divided into two parts, a PreCE and a PostCE. The PreCE is independent of a Velocity Estimation (VE) module and the Automatic Frequency Control (AFC) while the PostCE depends upon the output of the VE and the AFC.

Figure 1:
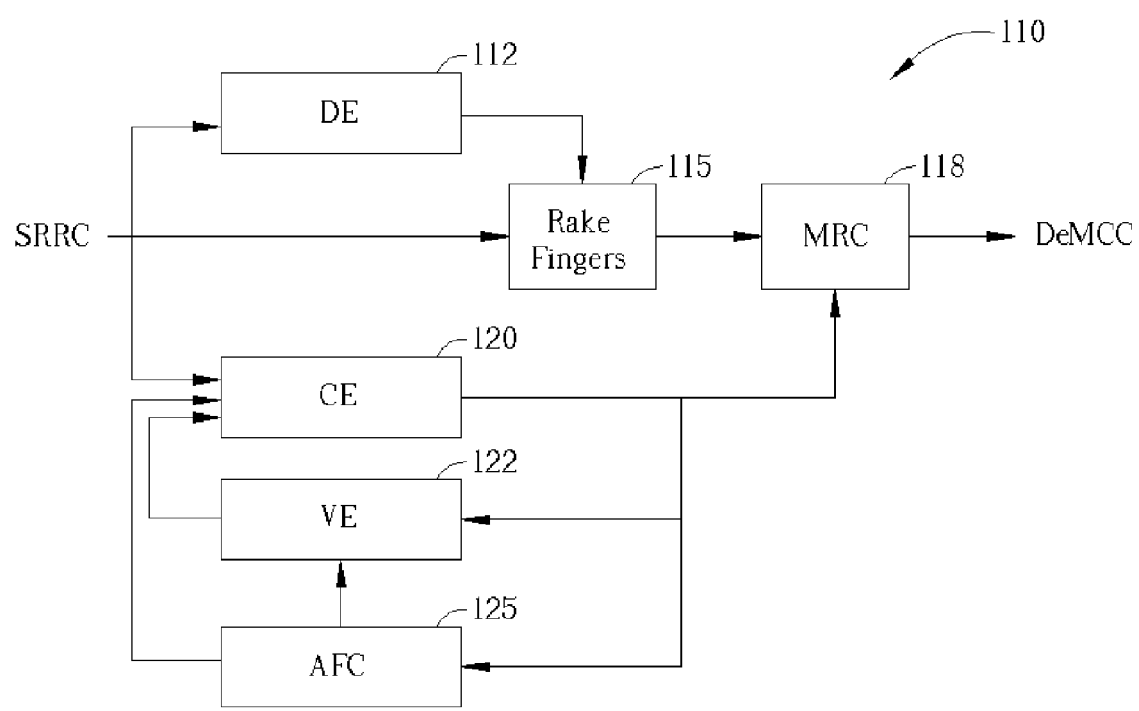
FIG. 1 is a block diagram of a WCDMA receiver according to the prior art.
Figure 2:
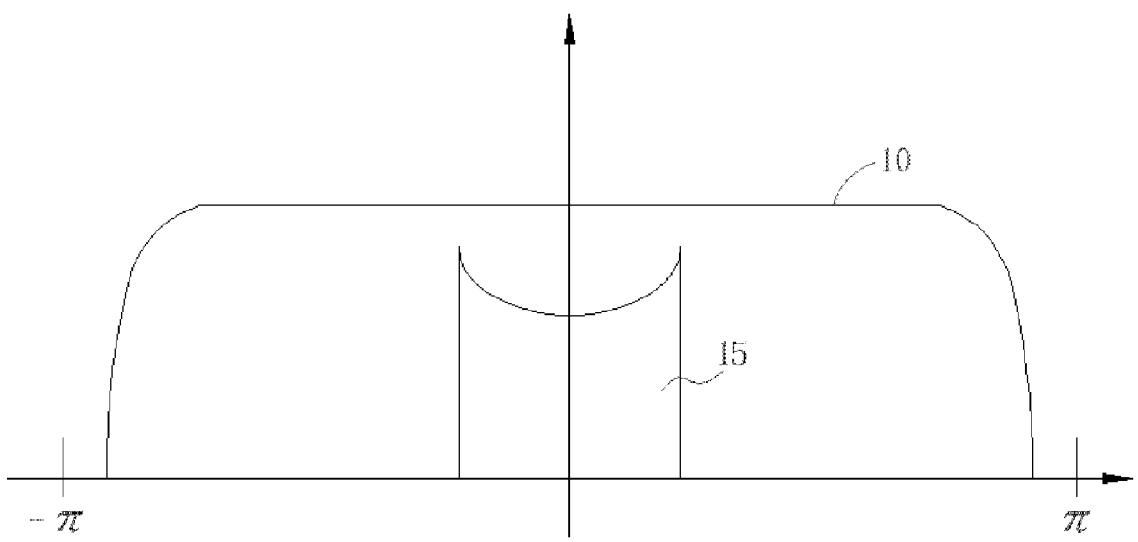
FIG. 2 illustrates the spectrum of a channel complex gain without a frequency offset.
Figure 3:
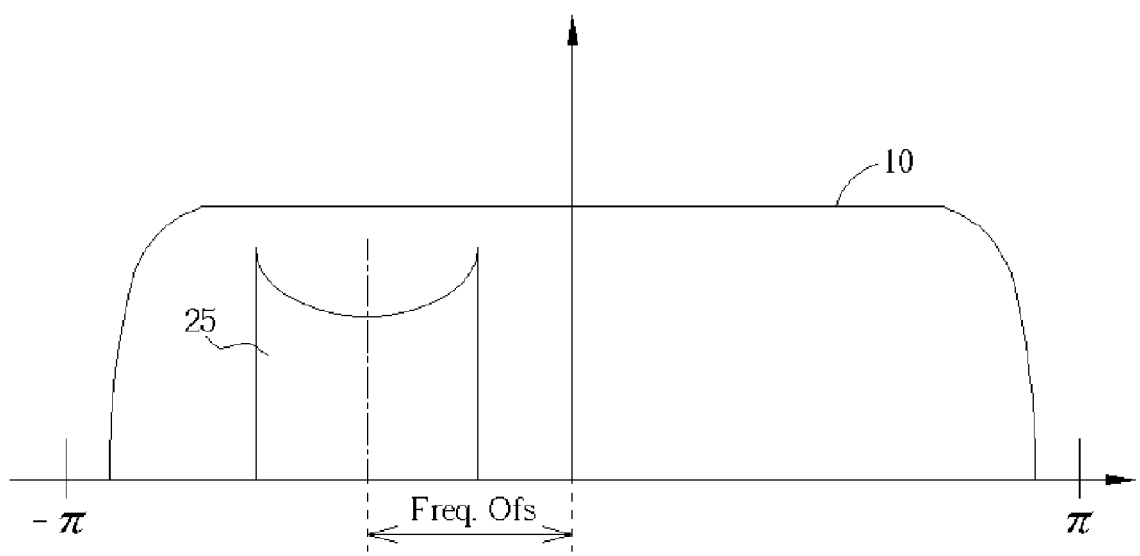
FIG. 3 illustrates an example spectrum of a channel complex gain with a frequency offset.
Figure 4:
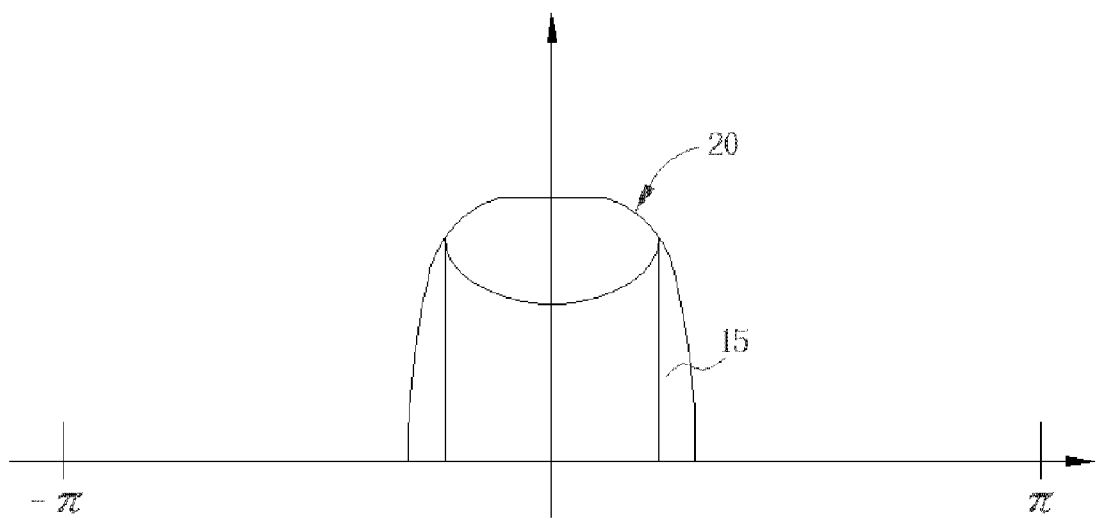
FIG. 4 illustrates the spectrum of a channel complex gain without a frequency offset within a narrow bandwidth.
Figure 5:
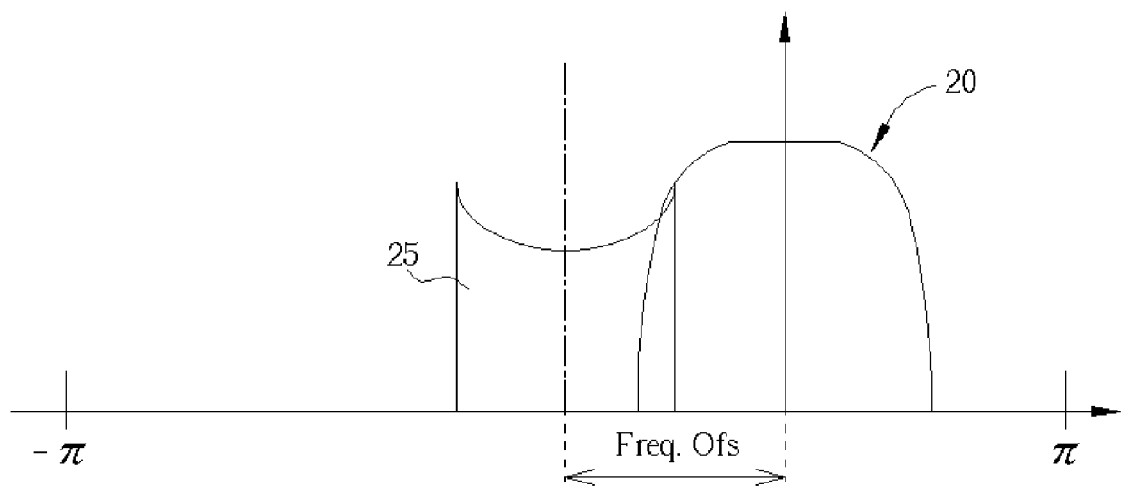
FIG. 5 illustrates the spectrum of a channel complex gain with a frequency offset falling outside of a narrow bandwidth.
Figure 6:
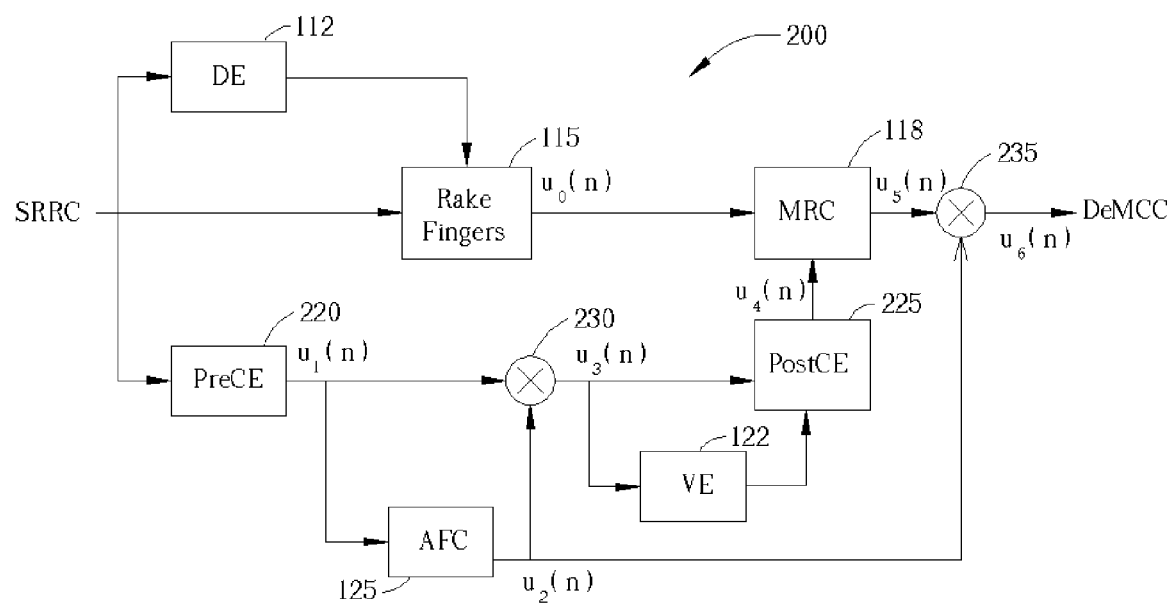
FIG. 6 is a block diagram of a WCDMA receiver according to the present invention.

A block diagram of the disclosed WCDMA receiver 200 is illustrated in FIG. 6. The WCDMA receiver 200 comprises the Delay Estimation (DE) module 112, the Rake Fingers module 115, the Maximum Ratio Combining (MRC) module 118, the VE module 122, and the AFC module 125 of the prior art receiver shown in FIG. 1. However, the receiver 200 further comprises a PreCE module 220, a PostCE module 225, a first mixer 230, and a second mixer 235.

An channel complex gain signal from a Square-Rooted-Raised-Cosine (SRRC) filter (not shown) is transmitted to the DE 112, to the Rake Fingers 115, and to the PreCE 220. The output of the DE 112 is fed to another input of the Rake Fingers 115. The output ($U_0(n)$) of the Rake Fingers 115 then is transmitted to the MRC 118. The output ($U_1(n)$) of the PreCE is transmitted to the first mixer 230 and to the AFC 125. The output ($U_2(n)$) of the AFC 125 is transmitted to the first mixer 230 and to the second mixer 235. The output ($U_3(n)$) of the first mixer 230 is transmitted to the PostCE 225 and to the VE 122. The output of the VE 122 is fed to the PostCE 225. The output ($U_4(n)$) of the PostCE 225 is connected to another input of the MRC 118 and the output ($U_5(n)$) of the MRC 118 is connected to a second input of the second mixer 235. The second mixer 235 completes the generation of the demodulated signal ($U_6(n)$) before Demultiplexing and Dechannel Coding (DeMCC).

The PreCE module 225 provides rough estimation results of the channel complex gain from the SRRC utilizing a bandwidth filter wide enough to allow the channel complex gain to pass through the PreCE 225 without encountering signal distortions. The rough estimation results $U_1(n)$ are passed to the AFC 125. The AFC 125 outputs a signal $U_2(n)$ that is transmitted to the first and second mixers 230 and 235. The first mixer 230 mixes the signal $U_1(n)$ with $U_2(n)$ and outputs the results as $U_3(n)$ to the VE 122 and to the PostCE module 225 to generate the compensating signals. The output of the VE 122 is also transmitted to the PostCE module 225. The output $U_4(n)$ of the PostCE 225 is sent to the MRC 118 which outputs a signal $U_5(n)$. Finally, the second mixer 235 mixes the signal $U_2(n)$ (from the AFC 125) with the signal $U_5(n)$ (from the MRC 118) to generate the signal $U_6(n)$. The signal $U_6(n)$ is then demodulated.

Although the PostCE module 225 relies on the compensating signals from the AFC 125 and the VE 122, the AFC 125 and the VE 122 rely only on the PreCE module 220. Because the feedback loops between the various modules of the prior art are eliminated in the present invention, the architecture is stable as long as the individual blocks are stable. The complexity is also taken into account. Since a frequency offset is a non-ideal effect of the relevant local oscillators, the amount of the offset is independent of multipath signals. Therefore, compensating the offset for each path in the multipath signal is not necessary and frequency offset can be compensated for after the MRC 118 using the second mixer 235. The PostCE module 225 and the MRC 118 compensate for the phase difference of each path.

The bandwidth filter of the PreCE module 220 is independent of the AFC 125 and the VE module 122 and should be wide enough to let the maximal Doppler spread and frequency offset pass. The bandwidth filter of the PostCE module 225 can be tailored according to the results of the VE module 122 and is thusly narrower than the bandwidth of the PreCE module 220, improving PostCE 225 performance.

The output of the Rake Fingers module 115 can be expressed as $$U_0(n)=dA_0 e^{j(\Delta\omega+\theta_0)}+i_0 \quad \text{(Equation 1)}$$

where d is the data symbol, $A_0$ is the channel amplitude gain, $\theta_0$ is the channel phase gain, $\Delta\omega$ is the frequency offset, and $i_0$ is the noise. It can also be assumed that the output of the PreCE module 220 is $$U_1(n)=dA_1 e^{j(\Delta\omega+\theta_1)}+i_1 \quad \text{(Equation 2)}$$

where $A_1$ is the estimated version of channel amplitude gain, $\theta_1$ is the estimated version of channel phase gain, and $i_1$ is the noise. These estimations are done in the PreCE module 220. The rough complex gain $U_1(n)$ is sent to the AFC 125 to generate the compensating signal given in equation 3.

$$U_2(n)=e^{-j(\Delta\omega+\theta_2)} \quad \text{(Equation 3)}$$

The phase noise and steady-state error are lumped into phase jitter $\theta_2$. The signal $U_1(n)$ is mixed with $U_2(n)$ and produces $$U_3(n)=A_1 e^{j(\theta_1-\theta_3)}+i_1 \quad \text{(Equation 4).}$$

Note that $e^{\Delta\omega n}$ is removed from the equation. This insures that the signal $U_3(n)$ can properly pass through the PostCE module 225. The signal $U_3(n)$ is also sent to the VE module 122. The VE module 122 estimates the velocity of the mobile unit relative to a base station and the bandwidth of the PostCE module 225 is adjusted accordingly.

The signal $$U_4(n)=A_1 e^{j(\theta_1-\theta_3+\theta_4)}+i_0 \quad \text{(Equation 5)}$$

results from passing $U_3(n)$ through the PostCE module 225, where $\theta_4$ is the phase response of the PostCE module 225. The out-of-band noise is suppressed. The MRC module 118 inputs $U_0(n)$ and $U_4(n)$ to perform phase and amplitude compensation with the multipath signals combined to produce $$U_5(n)=\Sigma dA_0 A_1 e^{j(\Delta\omega+\theta_0-\theta_1+\theta_4)}+i_5 \quad \text{(Equation 6).}$$

Assuming an estimation of channel phase gain is $\Delta\theta=\theta_0-\theta_1$, the signal $U_5(n)$ can also be expressed as $$U_5(n)=\Sigma dA_0 A_1 e^{j(\Delta\omega+\Delta\theta+\theta_3-\theta_4)}+i_5 \quad \text{(Equation 7).}$$

The mixer 235 then produces the final results $$U_6(n)=\Sigma dA_0 A_1 e^{j(\Delta\theta+\theta_4)}+i_6 \quad \text{(Equation 8).}$$

If the noise term $i_6$ in equation 8 is ignored, only the CE error remains and the frequency offset is removed. Note that the phase noise of the AFC 125, $\theta_2$ is also removed. The signals pass though the blocks with precisely tailored bandwidth and no feedback loops exist between the blocks.

It is an advantage of the claimed invention that no feedback loops exists between the functional blocks of the WCDMA receiver 200, allowing a precisely tailored bandwidth and improved performance.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A wireless receiver comprising:
    a PreCE module comprising a first bandwidth filter, an input for receiving a channel complex gain, and an output for outputting an estimation of the channel;
    a Velocity Estimation (VE) module having an input electrically connected to the output of the PreCE module for receiving the output of the PreCE module; and
    a PostCE module comprising a second bandwidth filter, a first input electrically connected to the output of the PreCE module for receiving the output of the PreCE module, and a second input connected to the output of the VE module;
    wherein the PostCE module substantially compensates for a Doppler induced frequency spread according to the output of the VE module before the output of the PreCE module is processed by the PostCE module so that the second bandwidth filter is narrower than the first bandwidth filter.

2. The wireless receiver of claim 1 further comprising:
    an Automatic Frequency Control (AFC) module having an input connected to the output of the PreCE module; and
    a first mixer having a first input connected to the output of the PreCE module and a second input connected to an output of the AFC module;
    wherein the first mixer mixes the output of the AFC module with the output of the PreCE module before the output of the PreCE module is received by the VE module and the PostCE module.

3. The wireless receiver of claim 2 further comprising:
    a Maximum Ratio Combining (MRC) module having a first input connected to the output of the PostCE module and a second input; and
    a second mixer having a first input connected to an output of the MRC module and a second input connected to the output of the AFC module;
    wherein the second mixer outputs a signal compensated for a frequency offset resulting from variations in local oscillators.

4. The wireless receiver of claim 3 further comprising:
    a Delay Estimation (DE) module having an input for receiving the channel complex gain; and
    a Rake Fingers module having a first input for receiving the channel complex gain, a second input connected to an output of the DE module, and an output connected to the second input of the MRC module.

5. A wireless receiver comprising:
    a PreCE module having an input for receiving a channel complex gain and an output;
    an Automatic Frequency Control (AFC) module having an input connected to the output of the PreCE module;
    a first mixer having a first input connected to the output of the PreCE module and a second input connected to an output of the AFC module;
    a Velocity Estimation (VE) module having an input connected to an output of the first mixer;
    a PostCE module having a first input connected to the output of the first mixer and a second input connected to an output of the VE module;
    a Maximum Ratio Combining (MRC) module having a first input connected to an output of the PostCE module; and
    a second mixer having a first input connected to an output of the MRC and a second input connected to the output of the AFC module.

6. The wireless receiver of claim 5 further comprising:
    a Delay Estimation (DE) module having an input for receiving the channel complex gain; and
    a Rake Fingers module having a first input for receiving the channel complex gain, a second input connected to an output of the DE module, and an output connected to a second input of the MRC module.

7. A method for signal demodulation in a wireless receiver, the receiver comprising a Velocity Estimation (VE) module, the method comprising:
    generating an estimation of a channel complex gain signal with a PreCE module comprising a first bandwidth filter;
    generating an estimate of velocity of the wireless receiver relative to a base station utilizing the VE module;
    substantially compensating the estimation of the channel complex gain for a Doppler frequency spread according to an output of the VE module; and
    compensating phase differences in the substantially compensated estimation of the channel complex gain with a PostCE module comprising a second bandwidth filter;
    wherein the second bandwidth filter is narrower than the first bandwidth filter.

8. The method of claim 7 wherein the wireless receiver further comprises:
    a Delay Estimation (DE) module having an input for receiving the channel complex gain signal;
    a Rake Fingers module having a first input for receiving the channel complex gain signal and a second input connected to the output of the DE module; and
    a Maximum Ratio Combining (MRC) module having a first input connected to an output of the Rake Fingers module, a second input connected to an output of the PostCE module, and an output for outputting a processed signal.

9. The method of claim 8 further comprising:
    generating a frequency offset compensation signal utilizing an Automatic Frequency Control (AFC) module according to the estimation of the channel complex gain; and
    mixing the frequency offset compensation signal with the processed signal to compensate for a frequency offset resulting from variations in local oscillators.

* * * * *